(12) United States Patent
Anslow et al.

(10) Patent No.: US 6,980,737 B1
(45) Date of Patent: Dec. 27, 2005

(54) METHOD AND APPARATUS FOR RAPIDLY MEASURING OPTICAL TRANSMISSION CHARACTERISTICS IN PHOTONIC NETWORKS

(75) Inventors: Peter J Anslow, Herts (GB); Richard W Heath, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 715 days.

(21) Appl. No.: 09/688,558

(22) Filed: Oct. 16, 2000

(51) Int. Cl.[7] .................................. H04B 10/08
(52) U.S. Cl. ................ 398/27; 398/25; 398/26; 398/49; 398/79; 398/58; 398/59; 398/60; 398/45; 375/321; 375/224; 714/704; 714/712
(58) Field of Search ................ 398/25, 26, 27, 398/79, 82, 173, 177, 45, 49, 58, 59, 60; 375/355, 224, 226, 327, 371, 321; 714/704, 714/705, 712; 371/5.1, 5.2

(56) References Cited

U.S. PATENT DOCUMENTS

| | | | | |
|---|---|---|---|---|
| 4,475,210 A | * | 10/1984 | Couch | 375/224 |
| 4,823,360 A | | 4/1989 | Tremblay et al. | 375/4 |
| 5,585,954 A | | 12/1996 | Taga et al. | 359/158 |
| 5,896,392 A | * | 4/1999 | Ono et al. | 714/705 |
| 5,943,147 A | * | 8/1999 | Vanoli et al. | 398/27 |
| 6,069,718 A | | 5/2000 | Khaleghi | 359/110 |
| 6,430,715 B1 | * | 8/2002 | Myers et al. | 714/704 |
| 6,445,471 B1 | * | 9/2002 | Shimokawa et al. | 398/79 |
| 6,463,109 B1 | * | 10/2002 | McCormack et al. | 375/355 |
| 6,532,087 B1 | * | 3/2003 | Ransford et al. | 398/27 |
| 6,538,779 B1 | * | 3/2003 | Takeshita et al. | 398/27 |
| 6,570,685 B1 | * | 5/2003 | Fujita et al. | 398/79 |
| 6,587,235 B1 | * | 7/2003 | Chaudhuri et al. | 370/216 |
| 6,766,113 B1 | * | 7/2004 | Al-Salameh et al. | 398/30 |
| 2002/0154353 A1 | * | 10/2002 | Heat et al. | |

* cited by examiner

Primary Examiner—Hanh Phan
(74) Attorney, Agent, or Firm—Barnes & Thornburg

(57) ABSTRACT

An apparatus for determining an error ratio of individual channels of a WDM optical signal comprises a wavelength-selective filter for separating the individual channels of the WDM signal and a measurement circuit for measuring an error ratio of one channel using a first decision threshold level. The measurement circuit is operable to cycle through all channels, taking an error ratio measurement for each channel in sequence with a predetermined decision threshold level. Control circuitry alters the decision threshold level for successive cycles of the measurement circuit.

The apparatus measures error ratio values for each channel in turn, building up an error ratio vs. threshold pattern enabling the Q value to be obtained. Although the time taken to build up the error ratio pattern for an individual channel is not shortened, measurements are taken on each channel at much shorter intervals. This means that signal degradations can be detected much more rapidly, as these signal degradations will be reflected in each error ratio measurements, and do not require a completely updated error ratio pattern to be obtained.

16 Claims, 6 Drawing Sheets

$$Q = \frac{\mu_1 - \mu_0}{\sigma_1 + \sigma_0}$$

$$\text{BER} = \frac{1}{2}\, erfc\left(\frac{Q}{\sqrt{2}}\right)$$

METHOD AND APPARATUS FOR RAPIDLY MEASURING OPTICAL TRANSMISSION CHARACTERISTICS IN PHOTONIC NETWORKS

FIELD OF THE INVENTION

This invention relates to performance evaluation analysis in optical systems, and particularly to enable the location of sources of degradations to be located within an optical communications network.

BACKGROUND OF THE INVENTION

Optical signals suffer degradation between the transmitter and receiver from such factors as noise, inter-symbol interference, fiber dispersion, non-linearity of the elements and transmission medium. In addition, in amplified wavelength division multiplexed (WDM) systems, the transmission characteristics vary from one channel to another due to the non-flat gain and noise profile of erbium-doped fiber amplifiers (EDFAs).

Distortion is defined as any inaccurate replication of a signal transmitted over a communication link, and could originate in any network element (NE) along the link. It can be measured by assessing the difference between the wave shape of the original signal and that of the signal at the network element of interest, after it has traversed the transmission link.

In the last decade, transmission rates of data signals have increased progressively, which has led to more complex and less tolerant transmission systems. For transmission at high rates, such as 40 or 80 Gb/s, the distortion of the optical link is a critical parameter. With various types of dispersion shifted fiber, dispersion compensating fiber and dispersion compensating elements that make up a given link, determining the cause of a distortion in the received signal is no longer a simple operation, especially in optical transmission systems with in-line optical amplifiers. System performance degradation caused by noise and optical path distortions are also usually difficult to separate, making the performance evaluation complicated.

In the evaluation of the characteristics of an optical fiber communication system, the bit error ratio (BER) has usually been used as a parameter for performance evaluation. BER is defined as the ratio between the number of erroneously received bits to the total number of bits received over a period of time (for example a second). A number of codes have been provided in the signal at transmitter for error detection, the basic idea being to add redundant bits to the input data stream over a known number of bits. The BER calculated by the receiver includes information on all impairments suffered by the signal between the transmitter and receiver, i.e. both noise and distortion together.

Performance of an optical system is also defined by a parameter called Q. The Q value (or Q-factor) indicates the 'useful signal'-to-noise ratio of the electric signal regenerated by the optical receiver, and is defined as follows:

$$[[Q = \frac{\mu_1 - \mu_0}{\sigma_1 + \sigma_2}]]$$

$$Q = \frac{\mu_1 - \mu_0}{\sigma_1 + \sigma_0}$$

where $\mu_1$ is the mean value of the '1's, $\mu_0$ is the mean value of the '0's, $\sigma_1$ is the standard deviation of the level of '1's, and $\sigma_0$ is the standard deviation of the level of '0's. These parameters can be understood from looking at the so-called eye diagram, which represents the received signal, time-shifted by integer multiples of the bit period, and overlaid. The eye diagram can be produced on an oscilloscope by applying a baseband signal to the vertical input of the oscilloscope and triggering the instrument time base at the symbol rate. For a binary signal, such an eye diagram has a single 'eye', which is open or closed to an extent determined by the signal degradation. An open pattern is desired, as this provides the greatest distance between signals representing a 1 and those representing a 0. Changes in the eye size indicate inter-symbol interference, amplitude irregularities, or timing problems, such as jitter, depending on the signal that is measured.

Figure 1:
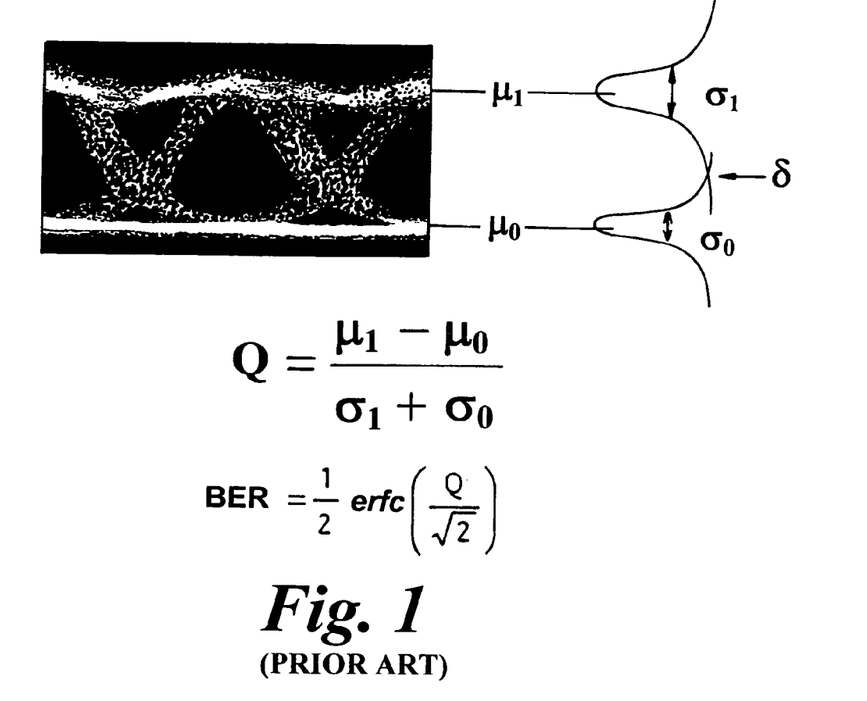
FIG. 1 shows an optical eye diagram.

An eye diagram is shown in FIG. 1, with representation of the $\mu$ and $\sigma$ values. The point 8 at which the probability density curves cross represents the decision threshold position to give the lowest error ratio. The value of Q can be used to derive the bit error ratio (BET) using the equation:

$$BER = \frac{1}{2} erfc\left(\frac{Q}{\sqrt{2}}\right) \text{ where } erfc \text{ is the complimentary error function}$$

Approximately, a Q value of 6 represents one error in $10^9$, and a Q value of around 7 represents one error in $10^{12}$. Optical systems have very low BERs under nominal conditions of operation, and therefrom measurement of BER under normal operating conditions is extremely time consuming. The measurement of the Q value is much quicker, but can still be too slow for some applications. In order to enable the Q value to be used more practically for error prediction purposes, it has been proposed to sweep the decision threshold of the receiver through all voltages from the voltage level corresponding to a zero to the voltage level corresponding to a one. For example, when the decision threshold is near the zero voltage level, there will be no errors in interpreting a "1", even if there is significant distortion. There will, however be a greatly increased error ratio in interpreting the zeros. The BER is measured for each decision threshold voltage, and by mapping the BER values using an appropriate function, a straight line extrapolation can be used to obtain the Q value, which then can be used to derive the BER for the actual decision threshold voltage, even though no errors may have been recorded for that decision threshold.

Figure 2:
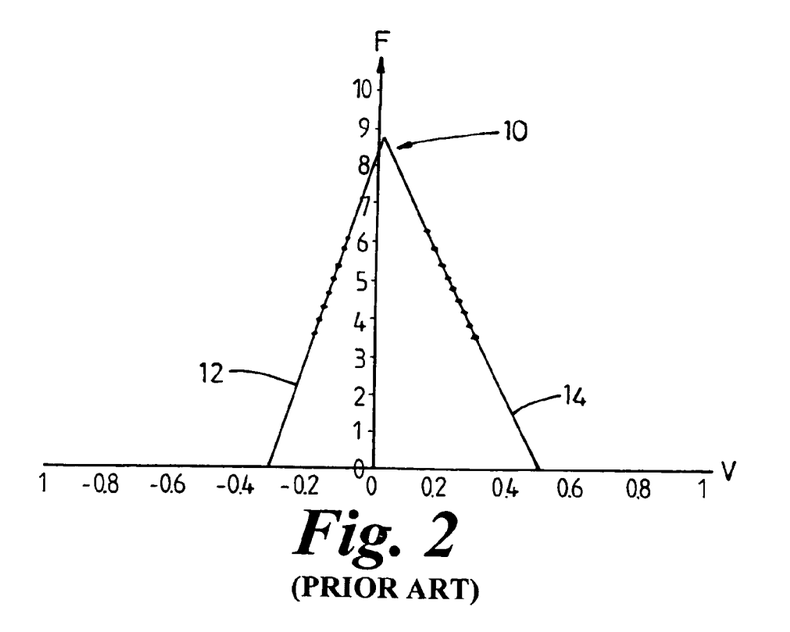
FIG. 2 shows how error ratio measurements can be used to determine the value of Q.

FIG. 2 shows a plot of the offset of the decision threshold voltage from the mid point (V) against a function (F) of the measured BER values. This function is:

$$\sqrt{2} \cdot srfc^{-1}(BER \times 4)$$

The apex 10 of two straight line fits 12,14 provides the optimum Q value (and the decision threshold required to achieve this value).

Although this approach avoids the need to take BER measurements where there is a very low incidence of errors (there are no measured values near the apex 10), accurate evaluation of the Q value does nevertheless require BER measurements to be taken on the low error ratio part of the curve. Typically, it may take at least 10 seconds to obtain one Q measurement (depending upon the desired accuracy). The evaluation of errors is required on a channel by channel basis, so that for a WDM system supporting 100 channels, this would require a cycle of at least 1000 seconds to measure the Q value of all channels. Measuring the Q value for each channel in turn results in an unacceptable delay between successive measurements on an individual channel.

U.S. Pat. No. 5,585,954 discloses an apparatus for measuring Q values, in which the time is reduced by measuring the BER for all decision threshold simultaneously. This of course requires a number of decision circuits which can simultaneously measure the BER when applying different decision thresholds. This complicates and increases the cost of the measurement circuitry.

SUMMARY OF THE INVENTION

According to a first aspect of the invention, there is provided an apparatus for determining an error ratio of individual channels of a WDM optical signal, comprising:
 a wavelength-selective filter for separating the individual channels of the WDM signal;
 a measurement circuit for measuring an error ratio of one channel using a first decision threshold level, the measurement circuit being operable to cycle through all channels, taking an error measurement for each channel in sequence with a predetermined decision threshold level; and
 control circuitry for altering the decision threshold level for successive cycles of the measurement circuit.

The invention provides an apparatus which measures error ratio values for each channel in turn, building up an error ratio vs. threshold pattern enabling the Q values to be obtained. Although the time taken to build up the error ratio pattern for an individual channel is not shortened, measurements are taken on each channel at much shorter intervals. This means that signal degradations can be detected much more rapidly, as these signal degradations will be reflected in each error ratio measurement, and do not require a completely updated error ratio pattern to be obtained.

Preferably, therefore, an error warning indicator provides an error warning when a measured error ratio exceeds the expected error ratio for the particular decision threshold being applied by a predetermined amount.

The measurement circuit measures an error ratio by monitoring the channel with the applied decision threshold level for a predetermined time period, which may for example be 0.1s. This time period is constant for all channels and for all decision threshold levels. If there are 100 channels, this means each channel will be visited, and an error ratio measurement obtained, every 10 seconds.

According to a second aspect of the invention, there is provided a method of determining an error ratio of individual channels of a WDM optical signal, comprising the steps of:
 (i) separating the individual channels of the WDM signal;
 (ii) measuring an error ratio of each channel in turn using a first decision threshold level;
 (iii) repeating step (ii) for different decision threshold levels until measurement levels for all decision threshold levels have been obtained for each channel.

The error ratio may be obtained by comparing the measured signal using the applied decision threshold with the measured signal using a default decision threshold. This default decision threshold is preferably that which gives the lowest true error ratio, namely the normal operating point for the decision threshold.

The apparatus of the invention may be implemented in a node of a WDM optical communications network, and the invention also applied to such a node and to the network constructed using the nodes. In such a network, each node comprises an optical switching arrangement for performing routing of signals across the network. In this case, the output path or paths of the node is provided with an apparatus of the invention for determining an error ratio of the individual channels of the WDM optical signal.

According to a third aspect of the invention, there is provided a WDM optical communications network comprising a plurality of nodes and a plurality of amplifiers between the nodes, each node comprising an optical switching arrangement for performing routing of signals across the network, wherein each node is provided with an apparatus for determining the Q-value of individual channels of the WDM optical signal, and wherein each optical amplifier is provided with optical spectrum analysis apparatus.

This arrangement enables fault location to be determined, and the nature of the fault to be identified. The Q value measurement enables some faults to be detected, such as high cross talk within a cross connect, whereas the spectrum analysis enables other faults to be detected.

According to a fourth aspect of the invention, there is provided an apparatus for measuring the Q-value of an optical data channel comprising a first decision circuit having a first, variable, decision threshold and a second decision circuit having a second, constant, decision threshold, and an XOR element which provides an output pulse when a different decision is made by the first and second decision threshold circuits, wherein the output pulses are used to determined the error ratio for different decision thresholds, and wherein the apparatus further comprises extrapolation circuitry for obtaining a Q-value from the error ratio values.

This provides a protocol independent Q-value measurement. The apparatus may further comprise a clock recovery circuit for analysing the optical data channel, the clock recovery circuit output being used to drive the decision circuits. If the clock recovery circuit then obtains the bit rate of the optical data channel, the apparatus can also be bit rate (line rate) independent.

According to a fifth aspect of the invention, there is provided a method of determining the Q-value of an optical data channel, comprising the steps of:
 (i) measuring an error ratio using a first decision threshold level by comparing the measured signal using the first decision threshold with the measured signal using a default decision threshold, such that the error ratio measurement independent of the protocol of the data channel;
 (ii) repeating step (ii) for different values of the first decision threshold level; and
 (iii) deriving the Q value from the error ratio values.

According to a sixth aspect of the invention, there is provided an apparatus for measuring the Q-value of an optical data channel, comprising a clock extraction circuit for deriving a clock signal at the data rate of the data channel, the clock signal being used by error measurement circuitry which measures a bit error ratio in the data, wherein the error ratio is used to obtaining a Q-value irrespectively of the data rate.

BRIEF DESCRIPTION OF THE DRAWINGS

Examples of the invention will now be described in detail with reference to the accompanying drawings, in which.

DETAILED DESCRIPTION

Figure 3:
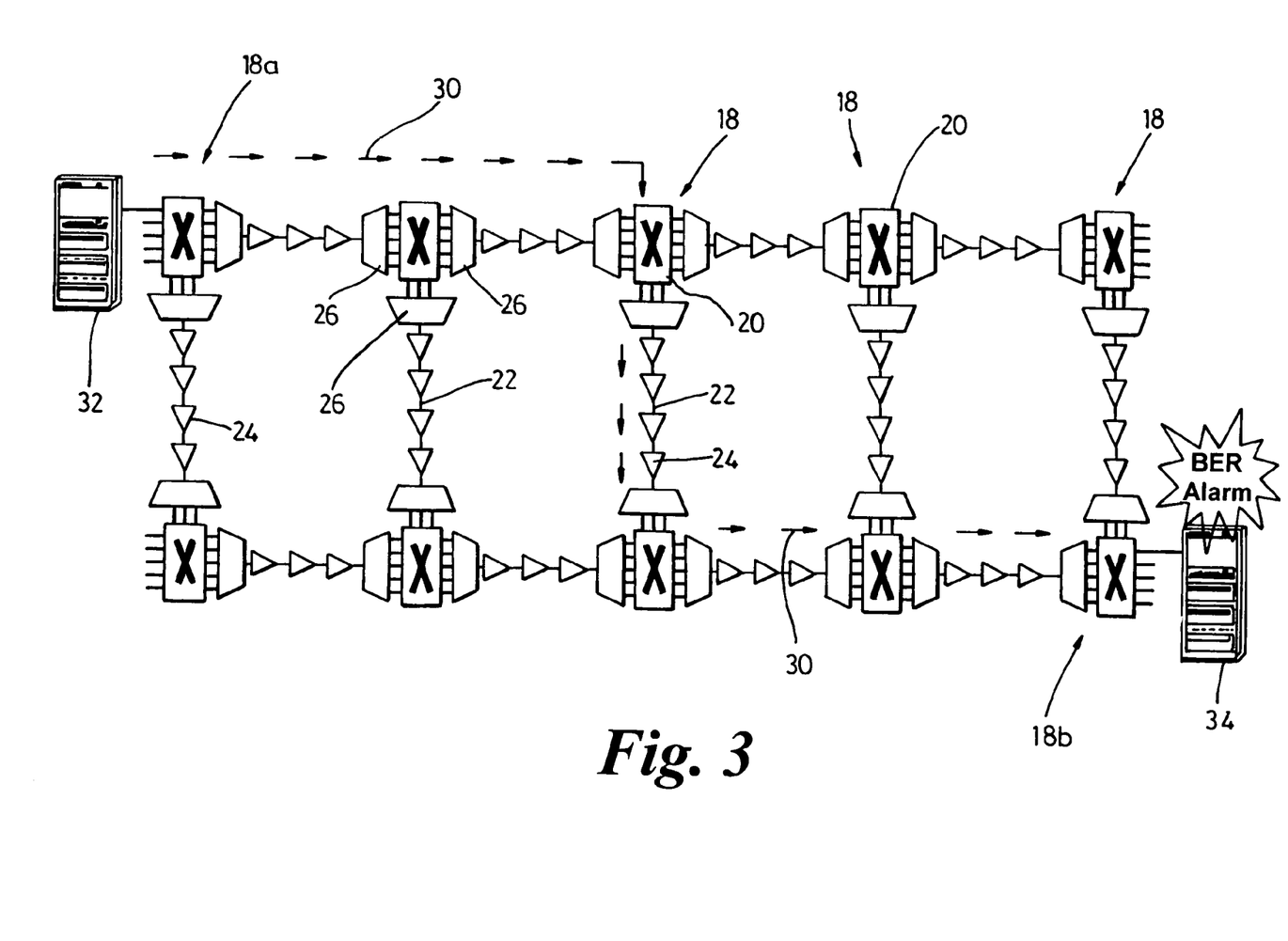
FIG. 3 shows an example communications network which can benefit from error detection of the invention.

FIG. 3 shows a WDM optical communications network comprising a plurality of interconnected nodes 18, each node comprising an optical switching arrangement 20 for performing routing of signals across the network. The nodes are connected together by optical fibers 22 along which optical amplifiers 24 are placed. The fibers 22 carry WDM optical signals, and each node comprises a multiplexing/demultiplexing units 26 which provide the individual channels of the WDM system on individual fibers to the switching arrangement 20.

The arrows 30 indicate one possible connection through the network enabling equipment 32 at a source node 18a to communicate with equipment 34 at a destination node 18b. The equipment 32, 34 is any device which provides optical signals for transmission over the network or which is provided for receiving signals from the network.

Dense-WDM systems are evolving towards all-optical solutions in which switching and routing take place in the optical domain. There are also hybrid proposals in which a packet header is optically encoded at a lower data rate than the data rate of the packet payload. This enables opto-electric conversion circuitry to be employed which has a lower detection bandwidth that that which would be required to carry out opto-electric conversion of the packet payload. The additional optical complexity of these networks increases the signal degradation resulting from optical effects, such as optical cross talk.

The equipment 34 may include some error detection capability. However, this will not indicate the location of the source of the signal degradation, which will normally result from a component failure or deterioration within one of the elements along the route 30. It is known to carry out optical spectrum analysis (OSA) at each amplifier 24 which can be used to detect amplifier failures and can also be used to control protection switching. However, such analysis does not enable all types of fault to be detected. For example, high levels of cross talk within a cross connect will result in eye closure, causing an increase in the BER. Although this may not result in a failure at that location, with further attenuation before the signal reaches the destination, there may be sufficient performance loss to cause unacceptable errors. An OSA will not detect this degradation, and failure indications at the destination node will not enable the fault to be located. An OSA also will not detect other eye closure faults, dispersion and non-linear effects.

Therefore, it has been recognised that Q measurement at the nodes can provide an indication of where a step change in the optical signal eye occurs, so that the cause can be isolated.

Figure 4:
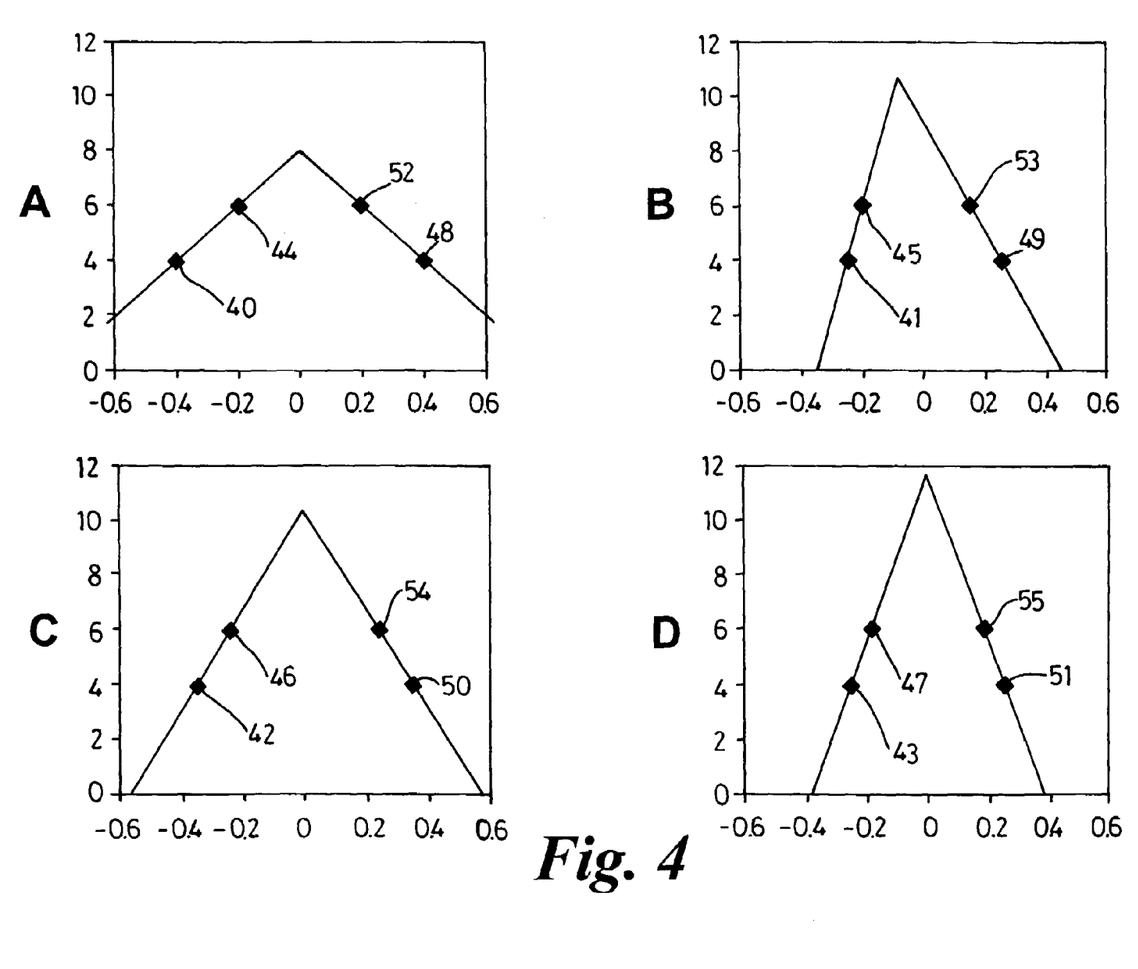
FIG. 4 is used to explain the error measurement operation of the invention.

FIG. 4 is used to explain the Q measurement operation of the invention. For simplicity, four channels A to D are represented in FIG. 4. The channels are separated from the WDM signal, using tuneable wavelength dependant filters. For each channel, a graph corresponding to that shown in FIG. 2 is established. However, instead of mapping each graph in turn, an error ratio of each channel is obtained in turn using a decision threshold level determined from the previous cycle of measurements. Because the Q value can be very different from channel to channel, measurements are made at threshold values tailored to each individual channel, and not at fixed levels. In the example BER measurements will be obtained in the order 40,41,42,43, which covers all four channels.

This step is repeated for updated decision thresholds so that BER measurements are taken to enable points 44,45, 46,47 to be plotted. Assuming no more errors are detected for decision threshold nearer to zero (because the error ratio is too low compared to the measurement period), then the decision threshold is changed to the upper side of the eye. In this way, the points 48 to 55 are plotted in increasing numerical order.

For the simplified case illustrates in FIG. 4, where there are only four BER measurements per channel, this process takes four measurement cycles per channel, but with the measurements interleaved. This means that each channel is visited once in every n measurement points, when there are n channels.

When measurement points for all decision threshold levels have been obtained for each channel, the Q value can be obtained by extrapolation, as explained above.

Figure 5:
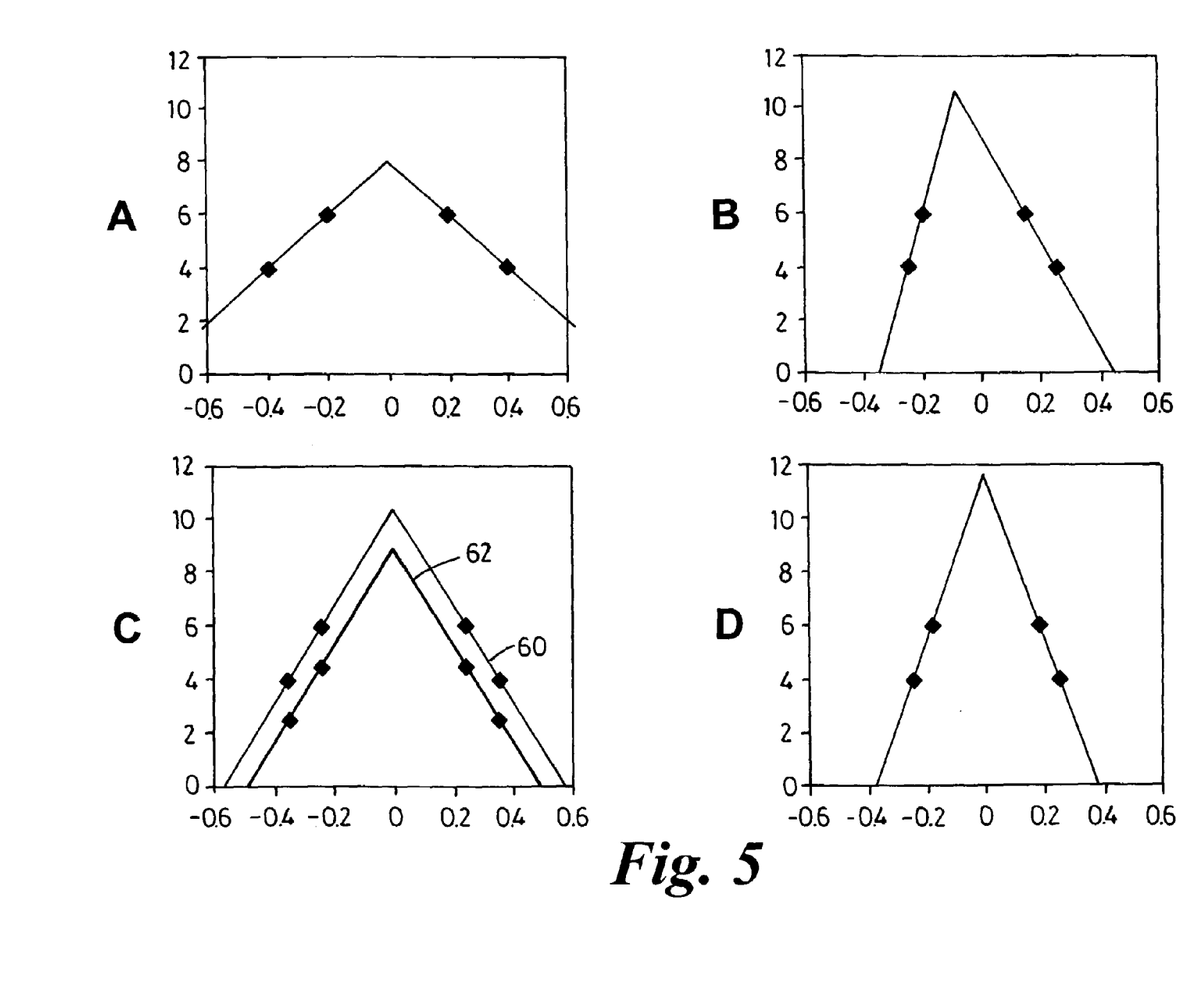
FIG. 5 is used to explain how the error measurement operation of the invention detects an increased degradation.

FIG. 5 corresponds to FIG. 4, but shows a degradation in channel C resulting in movement of the plot from curve 60 to curve 62. This degradation may be the result of increased crosstalk in the optical switch, causing eye closure, or it may result from increased noise. The reduction in the Q value influences all measured points. Therefore, the next measurement taken for that channel, no matter which decision threshold is to be applied, will show a significantly changed error ratio.

Ranges of error ratios which are statistically compatible with the expected average error ratio may be calculated, and deviation outside these expected levels can then prompt an error message to indicate a likely component or other fault. Since this operation is carried out at each node, preferably at the node output, the location of the fault is determined.

The points nearer the apex, with decision threshold near the optimum value require more measurement time, since less errors occur in a fixed time interval. The invention preferably applies a constant time interval to the measurement operation, to ensure that each channel is visited sufficiently frequently. It is possible, however, to apply the decision thresholds nearer to the center of the eye a greater number of times than the decision thresholds nearer the 1 and 0 levels, as these will produce more errors. For example, in the simplified case shown in FIG. 4, measurements may be taken at points 44 and 52 twice for each time a single measurement is taken at points 40 and 48. Although the measurement time remains the same, so that each channel is visited every fourth measurement period, more measurement time is allocated to the low error ratio points.

The range of error ratios considered to be normal will also be larger for the lower error ratio measurements (nearer the apex) of the graphs of FIGS. 4 and 5.

FIGS. 4 and 5 show a greatly simplified case. In practice, measurements may be taken for 6 to 12 points. Taking the example of six measurement points, a measurement time of 0.1s and 10 channels, a complete cycle may involve visiting the two highest error ratio points once (0.1s each), the two middle error ratio points four times (0.4s each) and the two lowest error ratio points forty times (4s each). The total measurement cycle per channel is then 9s (90s for all channels), but each channel is visited every 1.0s (0.1×10).

Of course, if more decision threshold levels are used, an appropriate scheme can be implemented. In each case, a single measurement period (0.1s) performed every second can trigger an alarm in the event of a sufficient change in the profile from the expected profile built up during the initial cycles.

Furthermore, the range of decision thresholds for which measurements are taken may also depend on the results obtained. For example, if not errors are recorded in the measurement interval at a particular decision threshold, there is no point taking measurements at a decision threshold nearer to zero, as it is almost certain that no errors will again be encountered.

Figure 6:
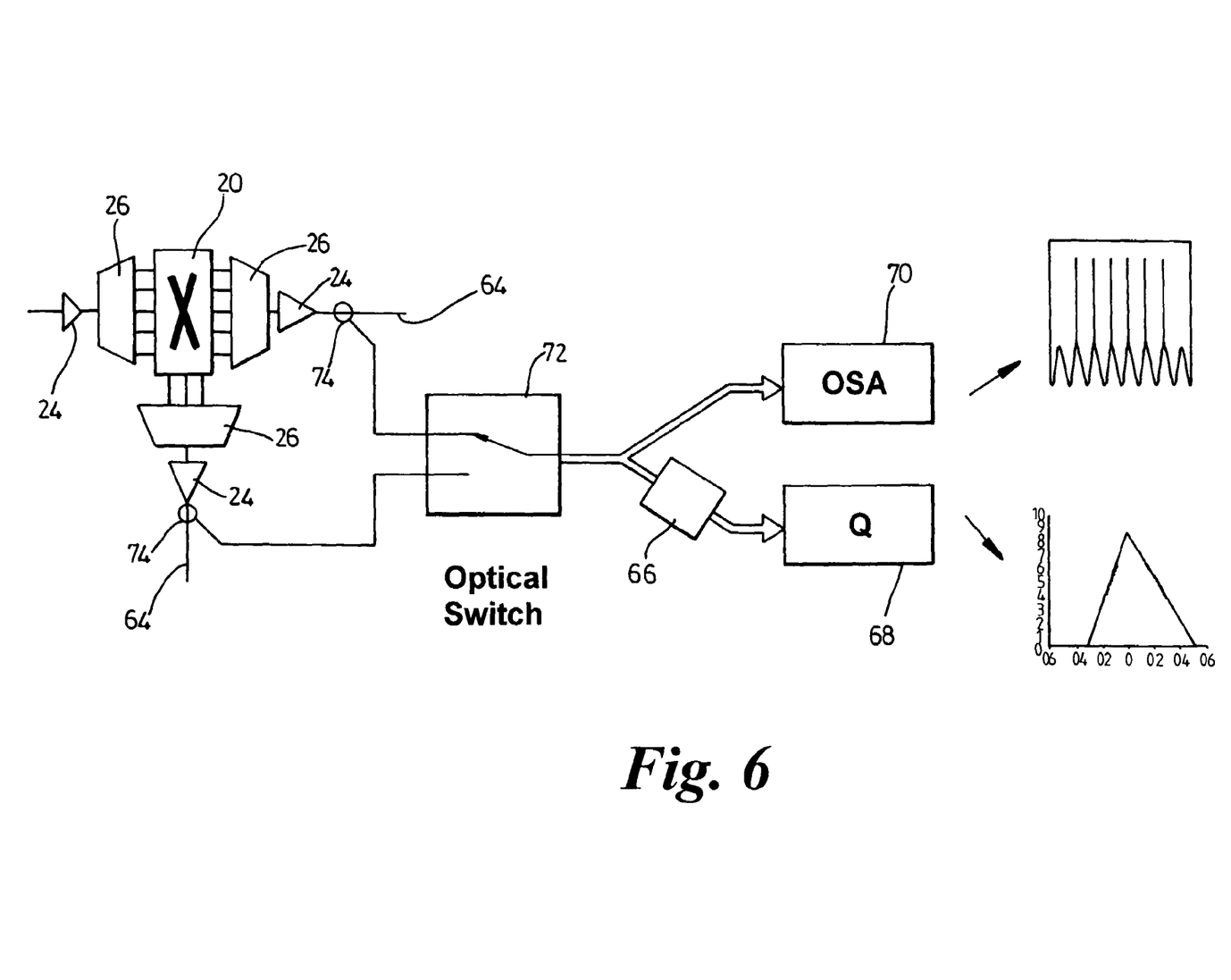
FIG. 6 shows a node of the invention for use in the network of FIG. 3.

FIG. 6 shows a node of the invention for use in the network of FIG. 3. The output paths 64 of the node are provided with an apparatus for determining an error ratio of individual channels of the WDM optical signal. A wavelength-selective filter 66 separates the individual channels of the WDM signal. These channels are then analysed by an apparatus 68 carrying out the functions described above. This apparatus has a switching arrangement to cycle through all channels, taking an error ratio measurement for each channel in sequence with a predetermined decision threshold level. Control circuitry alters the decision threshold level for successive cycles of the measurement circuit.

Optical spectrum analysis may also be carried out at the output of the node, by analyser 70. Optical spectrum analysis may be carried out at all amplifier sites, and may measure channel power and inter-channel noise, but this does not obtain eye closure information. The two or more outputs of the node may be analysed by the same circuitry 66,68,70 by using an optical switching arrangement 72. The signals from the outputs 64 are supplied to the circuitry 66,68,70 using optical splitters 74.

Figure 7:
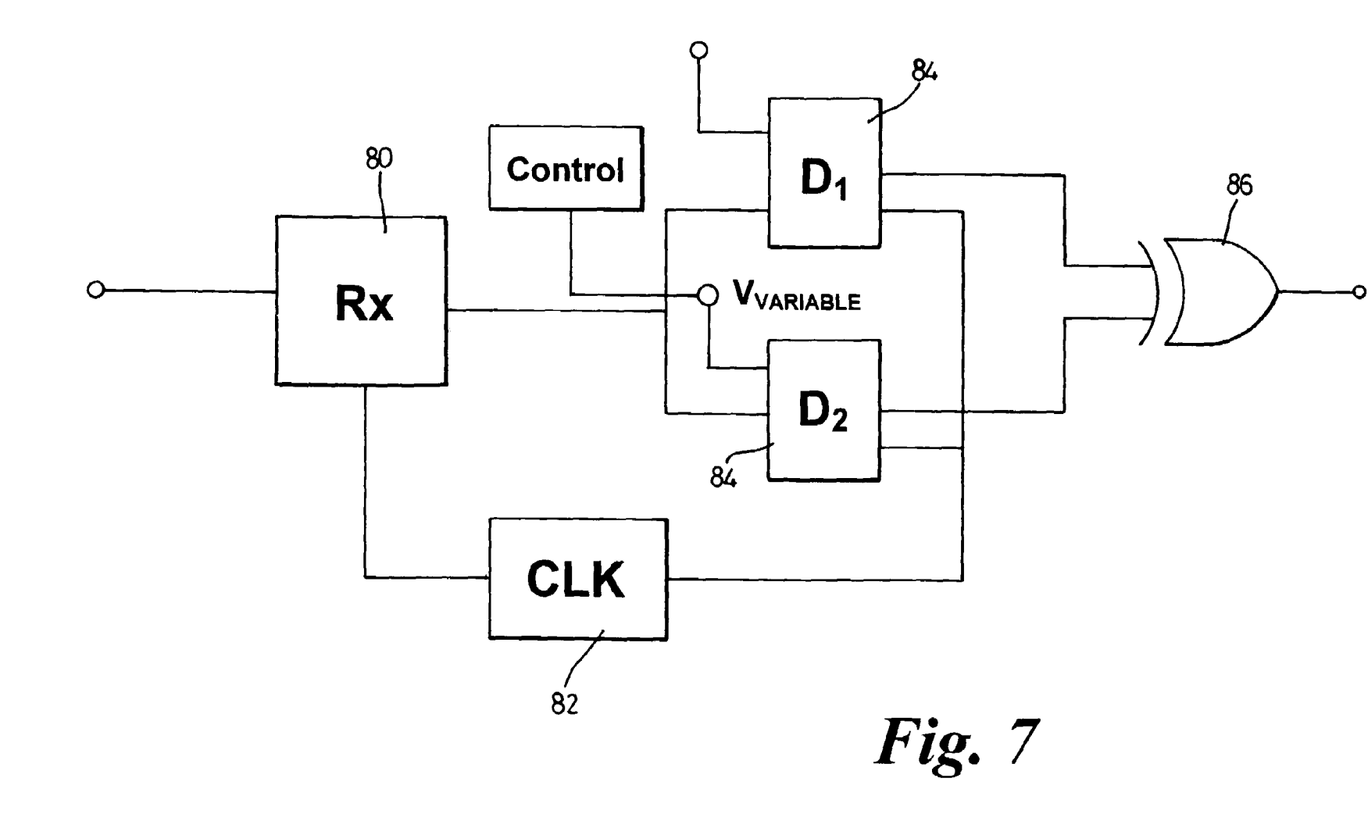
FIG. 7 shows error measurement circuitry used in the error measurement apparatus of the invention.

FIG. 7 shows the error measurement circuitry used in the apparatus 68. A receiver 80 supplies a signal to a clock extraction circuit 82, which clocks the comparators 84. The clock extraction circuit can provide adaptive clock recovery, so that the error measurement is bit rate independent. The error ratio is obtained by comparing the measured signal from one decision circuit D1 (essentially a comparator) which uses the applied decision threshold $V_1$ with the measured signal from another decision circuit D2 which uses the lowest error ratio decision threshold $V_2$, namely the normal operating point for the decision threshold of that channel. These two measured signals are supplied to an XOR element 86 which provides an output pulse when the inputs are different. This assumes the normal operating point provides an error free signal, so that all differences to this are errors, and the rate is measured to obtain the BER. High error ratio counts are of course less accurate than low error ratio counts if the errors cross the normal decision threshold. However, in this case, there are still many more errors from the comparator with the offset threshold than the comparator with the normal threshold allowing the estimation of Q to remain reasonably accurate.

One particular circuit for measuring the error ratio has been shown, and which has the advantage of being protocol independent. However, other techniques for measuring the error ratio can be employed, such as by using a data structure embedded in the channel data. This may be BIPS data built into the signal being measured.

We claim:

1. An apparatus for determining an error ratio of individual channels of a WDM optical signal, comprising:
    a wavelength-selective filter for separating the individual channels of the WDM signal;
    a measurement circuit for measuring an error ratio of one channel using a decision threshold level, the measurement circuit being operable to cycle through all channels, taking an error ratio measurement for each channel in sequence with a predetermined decision threshold level; and
    control circuitry for altering the decision threshold level for successive cycles of the measurement circuit,
    wherein measured error ratios for each channel using different decision thresholds are combined to determine a channel error ratio.

2. Apparatus according to claim 1, further comprising an error warning indicator which provides an error warning when a measured error ratio exceeds the expected error ratio for the particular decision threshold being applied by a predetermined amount.

3. Apparatus according to claim 1, wherein the measurement circuit measures an error ratio by monitoring the channel with the applied decision threshold level for a predetermined time period, which time period is constant for all channels and for all decision threshold levels.

4. A method of determining the Q-factor of individual channels of a WDM optical signal, comprising the steps of:
    (i) separating the individual channels of the WDM signal;
    (ii) measuring an error ratio of each channel in turn using a first decision threshold level;
    (iii) repeating step (ii) for different decision threshold levels until measurement levels for all decision threshold levels have been obtained for each channel; and
    (iii) combining the measurement levels for each channel to determine a channel Q factor.

5. A method according to claim 4, wherein in the measuring step, the channel is monitored with the applied decision threshold level for a predetermined time period, which time period is constant for all channels and for all decision threshold levels.

6. A method according to claim 4, wherein an error alarm is produced if an individual measured error ratio exceeds the expected error ratio for the particular decision threshold being applied by a predetermined amount.

7. A method according to claim 4, wherein the error ratio is obtained by comparing the measured signal using the applied decision threshold with the measured signal using a default decision threshold.

8. A method according to claim 4, wherein the error ratio is obtained by using a data structure embedded in the channel data.

9. A WDM optical communications network comprising a plurality of nodes, each node comprising an optical switching arrangement for performing routing of signals across the network, wherein the output path or paths of one or more nodes are provided with an apparatus for determining an error ratio of individual channels of the WDM optical signal, the apparatus comprising:
    a wavelength-selective filter for separating the individual channels of the WDM signal;
    a measurement circuit for measuring an error ratio of one channel using a first decision threshold level, the measurement circuit being operable to cycle through all channels, taking an error ratio measurement for each channel in sequence with a predetermined decision threshold level; and
    control circuitry for altering the decision threshold level for successive cycles of the measurement circuit,
    wherein measured error ratios for each channel using different decision thresholds are combined to determine a channel error ratio.

10. A network according to claim 9, further comprising an error warning indicator which provides an error warning when a measured error ratio exceeds the expected error ratio for the particular decision threshold being applied by a predetermined amount.

11. A network according to claim 9, wherein the measurement circuit measures an error ratio by monitoring the channel with the applied decision threshold level for a predetermined time period, which time period is constant for all channels and for all decision threshold levels.

12. A network according to claim 9, wherein each node is provided with an apparatus for determining an error ratio.

13. A network according to claim 9, wherein each node is further provided with an optical spectrum analyzer.

14. A node for a WDM optical communications network, comprising an optical switching arrangement for performing routing of signals across the network, wherein the output path or paths of the node is provided with an apparatus for determining an error ratio of individual channels of the WDM optical signal, the apparatus comprising:

a wavelength-selective filter for separating the individual channels of the WDM signal;

a measurement circuit for measuring an error ratio of channel using a first decision threshold level, the measurement circuit being operable to cycle through all channels, taking an error ratio measurement for each channel in sequence with a predetermined decision threshold level; and control circuitry for altering the decision threshold level for successive cycles of the measurement circuit, wherein measured error ratios for each channel using different decision thresholds are combined to determine a channel error ratio.

15. A node according to claim 14, wherein the measurement circuit measures an error ratio by monitoring the channel with the applied decision threshold level for a predetermined time period, which time period is constant for all channels and for all decision threshold levels.

16. A node according to claim 14, further comprising an error warning indicator which provides an error warning when a measured error ratio exceeds the expected error ratio for the particular decision threshold being applied by a predetermined amount.

* * * * *